Jan. 16, 1968  H. W. BAKER  3,363,936
TOUGHENED SHEETS OF GLASS

Filed March 16, 1965  2 Sheets-Sheet 1

Inventor
Henry Wellstood Baker
By
Morrison, Kennedy & Campbell
Attorneys

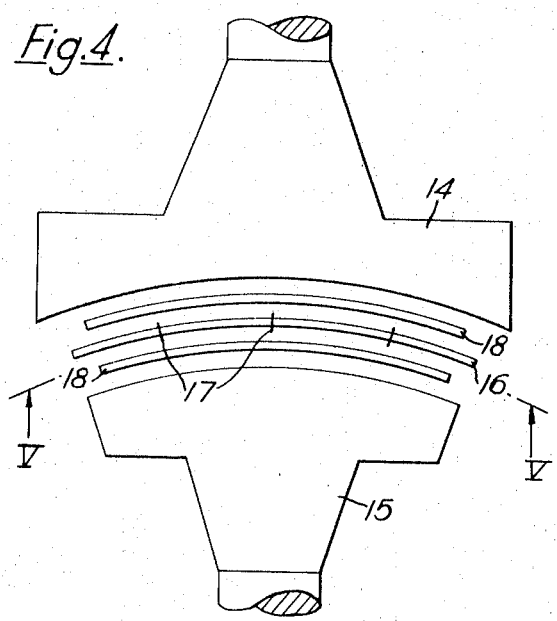
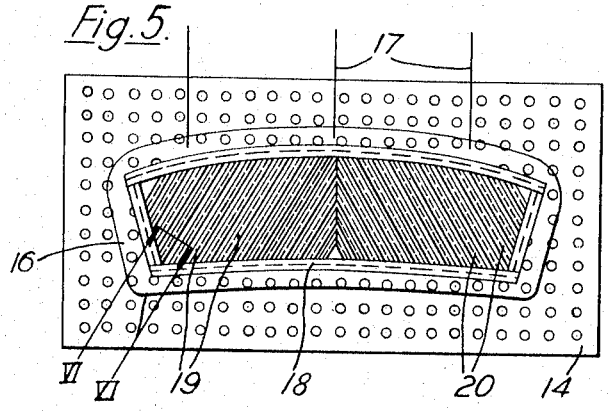
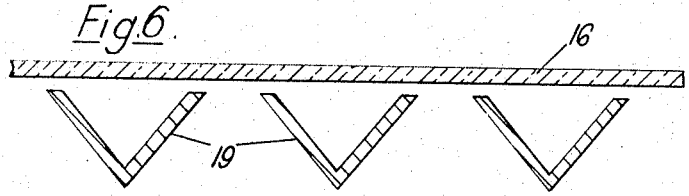

United States Patent Office 3,363,936
Patented Jan. 16, 1968

3,363,936
TOUGHENED SHEETS OF GLASS
Henry Wellstood Baker, Birmingham, England, assignor to Pilkington Brothers Limited, Liverpool, England, a company incorporated under the laws of Great Britain
Filed Mar. 16, 1965, Ser. No. 440,258
Claims priority, application Great Britain, Mar. 24, 1964, 12,498/64
5 Claims. (Cl. 296—84)

ABSTRACT OF THE DISCLOSURE

A windshield having a peripheral region which has been toughened to a high degree, and a contiguous interior peripheral region which has been toughened to a lesser degree and having interiorly thereof two series of strips extending angularly outward at both sides of a central line extending from the top edge to the bottom edge of the windshield and each series being composed of more highly toughened and less highly toughened strips in alternation.

---

Figure 1:
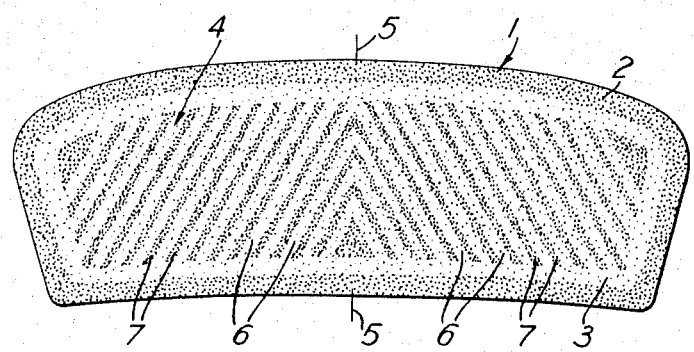

This invention relates to toughened sheets of glass such as are suitable, for example as automobile windscreens, and to methods of and apparatus for producing such toughened sheets of glass.

It is known to toughen sheets of glass so that when the glass is fractured, the presence of sharp cutting edges of glass is avoided. It is also known to produce in a toughened glass sheet for use, for example as the windscreen of an automobile, areas of glass having different degrees of toughening so that when the sheet of glass is fractured a proportion of the glass will contain larger particles which will give a better visibility than the visibility obtainable through fine fracture particles formed on fracture of highly toughened glass.

In co-pending United States patent applications Nos. 373,971, filed June 10, 1964; 373,974, filed June 10, 1964, now abandoned, and 431,797 filed Feb. 11, 1965, methods have been described of producing a toughened glass sheet of which an area persists as a vision zone comprising regions of glass which are toughened to a relatively low degree, separated from one another by more highly toughened regions of glass. In the preferred embodiments in each of the said co-pending patent applications, the regions are strips of glass extending in the transverse direction of the toughened glass sheet.

It is a main object of the present invention to provide a new and improved toughened glass sheet comprising zones of alternate coarse fracturing and fine fracturing glass, and particularly suitable for use as the windscreen of an automobile.

As already mentioned, in the examples illustrated in the said co-pending patent applications the alternate areas of fine and coarse fracturing glass are in the form of elongated strips of glass arranged transversely of the screen so that when broken they form bands of fine and coarse fracture patterns. As a result, there are in front of the driver of a car or other automobile whose windscreen is fractured comparatively clear areas of glass through which sufficient vision is available for him to control the car with adequate vision of the road ahead.

If, however, there is a vehicle or other obstruction in front of and to the near side of his car, the driver's view towards that obstruction obliquely through part of the shattered windscreen on the passenger's side of the car is not so good as the driver's view straight ahead. This is because the driver is looking obliquely through the elongated strips of coarse and fine fracture particles extending transversely to the windscreen, and this undesirable effect is particularly noticeable in the case of a car windscreen which is raked back at an angle, for example 30° or 35° or more from the vertical.

The present applicant has found that if the alternate areas of glass on the passenger's side of the windscreen are arranged in the glass sloping downwardly and outwardly at an angle, for example of about 30°, they will, when viewed from the position of the driver, be foreshortened and appear to be comparatively vertical, and consequently the driver's view of any obstruction through that part of the windscreen will be considerably better than when the alternate areas are arranged transversely of the screen. On the other hand, the driver's view straight ahead will not be materially altered by inclining the alternate areas of glass in front of him up to an angle of about 35°, because the driver will be looking more directly through the glass windscreen when he is viewing the road ahead.

According to the present invention there is provided a toughened glass sheet for use as windscreens in an automobile, characterized by the toughened glass sheet having a highly toughened peripheral zone, and a viewing zone for the driver on the passenger side of the vehicle, surrounded by a continuous demarcation zone toughened to a lesser degree than the peripheral zone, said viewing zone consisting of elongated areas toughened alternately to a higher and a lesser degree of toughening, said elongated areas sloping downwardly at an obtuse angle to the upper edge of the windscreen and downwardly to the lower edge.

From another aspect, the present invention consists of a toughened glass sheet having a highly toughened peripheral zone, and a viewing zone for the driver on the passenger side of the vehicle, surrounded by a continuous demarcation zone toughened to a lesser degree than the peripheral zone, said viewing zone consisting of strips of highly toughened glass alternating with strips of lesser toughened glass, each of the strips being sloped downwardly at an angle of about 30° to a line drawn normal to the top edge of the glass sheet and extending into the respective area of the viewing zone.

In accordance with the present invention the toughened glass sheet may advantageously be formed with viewing zones for the driver as well as the passenger and from this aspect the present invention comprises a windscreen characterized in that on each side of a central line extending between the upper and lower edges of the windscreen, the area enclosed by the demarcation zone is similarly formed on each side of the said central line with the alternating strips of highly toughened and lesser toughened glass so that the lesser toughened strips merge into the demarcation zone.

Viewing zones constructed according to the present invention are particularly advantageous in a "wrap-around" windscreen and from this aspect the invention comprises a "wrap-round" windscreen having a highly toughened peripheral zone and a viewing zone extending into the "wrap-round" portion of the windscreen at the passenger side of the vehicle, said viewing zone being surrounded by a continuous demarcation zone toughened to a lesser degree than the peripheral zone and consisting of strips of highly toughened glass alternating with strips of lesser toughened glass, each of said strips being sloped downwardly at an angle of about 30° to a line drawn normal to the top edge of the windscreen and extending into the respective area of the viewing zone of the windscreen.

A windscreen according to the present invention may advantageously be provided with viewing zones for both the passenger and the driver and from this aspect the present invention comprises a "wrap-round" windscreen as described above but characterized in that on each side of a central line extending between the upper and lower edges of the windscreen, the area enclosed by the demarcation zone is similarly formed on each side of the said central line with the alternating strips of highly toughened and lesser toughened glass so that the lesser toughened strips merge into the demarcation zone.

Figure 2:
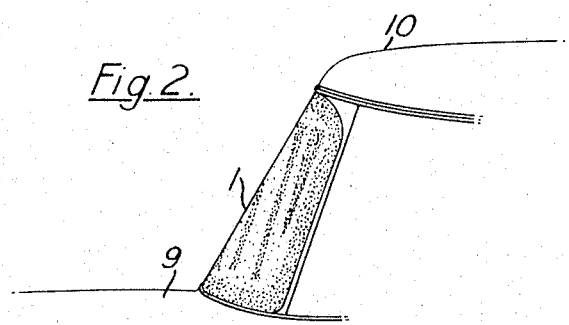
Figure 3:
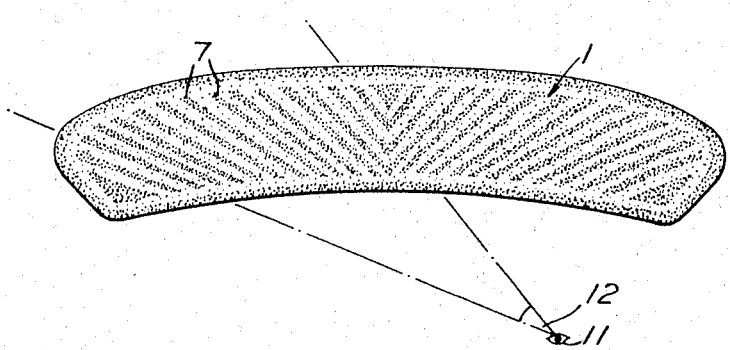

In order that the invention may be more clearly understood, the following detailed description is made purely by way of example with reference to the accompanying diagrammatic drawings in which:

FIGURE 1 is a view of a fractured automobile windscreen in accordance with the present invention, the fracture pattern obtained indicating the toughening pattern present in the windscreen, FIGURE 2 is a fragmentary side view of a portion of an automobile containing the windscreen of FIGURE 1 installed in the automobile, FIGURE 3 is a plan view of the windscreen of FIGURE 1 in the position in which it would be mounted in an automobile, for example, the automobile of FIGURE 2, FIGURE 4 is a plan view of apparatus for manufacturing an automobile windscreen in accordance with the present invention, FIGURE 5 is a view of the apparatus according to FIGURE 4, including a heated glass sheet, the view being taken along the line V—V of FIGURE 4, and FIGURE 6 shows an enlarged cross-sectional view of one set of angle bars taken along the line VI—VI of FIGURE 5.

In the drawings, like reference numerals designate the same or similar parts.

With reference to FIGURE 1 of the accompanying drawings, there is indicated at 1 an automobile windscreen which comprises a sheet of toughened glass. The automobile windscreen 1 is shown as a fractured windscreen and the windscreen includes a continuous peripheral region 2 of which is toughened to a first or high degree of toughening and which yields on fracture a particle count of the order of 20 particles per square inch or more.

Contiguous with the said continuous peripheral region 2 is an annular demarcation region 3 which is toughened to a lesser degree than the continuous peripheral region, and the annular demarcation region 3 yields on fracture of the glass sheet particles up to, but generally not exceeding, 1 square inch in area. Within said annular demarcation region 3 there is a central area 4 which is effectively divided into two equal parts by a line 5 extending transversely through the centre of the glass sheet. Each of the parts comprising the central area of the glass sheet includes a series of strips 6 of glass which are toughened to a lesser degree of toughening than the continuous peripheral region 2. The strips 6 are advantageously toughened to an extent similar to the degree of toughening in the annular demarcation region 3.

The strips 6 are separated from one another by strips 7 of more highly toughened glass, and the strips 7 are advantageously toughened to an extent to give, on fracture, particles compatible with a particle count in excess of about 15 per square inch.

The respective strips 6 and 7 are both arranged in series of parallel strips in each part of the central area of the windscreen and the strips are all inclined at an angle of approximately 30° to a normal drawn through the upper edge of the windscreen at a point where any individual strip, if extended, would reach the upper edge of the windscreen. Another aspect is that each strip would, if extended, meet the upper edge at an obtuse angle of about 120°. The strips 6 and 7 extend downwardly and outwardly in relation to the upper edge of the windscreen and to the parts of the continuous peripheral region and the annular demarcation zone near the upper edge of the windscreen.

Frequently the automobile windscreen will comprise a curved sheet of toughened glass, for example curved to form a "wrap-around" windscreen.

In FIGURE 2 of the accompanying drawings, there is shown a fragmentary side view of a portion of a car containing such a curved windscreen 1 having a fracture pattern similar to the fracture pattern described with reference to FIGURE 1. The fragmentary view of FIGURE 2 indicates at 9 the upper outline of the bonnet of the car and at 10 the outline of the roof of the car. It will be observed that the windscreen 1 is mounted in the car so that the windscreen is raked back at an angle of approximately 35° to the vertical.

FIGURE 3 of the accompanying drawings is a diagrammatic drawing showing only the plan view of the windscreen 1 mounted in the car of FIGURE 2 and the eye position 11 of the driver of the car in the case when the car has a right-hand drive in accordance with the general practice in the United Kingdom.

The present invention is primarily concerned with the view which the driver has through the part of the windscreen on the passenger's side of the windscreen and the approximate limits of the view through this part of the windscreen are indicated by the angle 12 in FIGURE 3.

Owing to the curvature of the windscreen 1 the strips 7 of fine fracturing particles which occur on fracture of the windscreen in the strips of more highly toughened glass in the central area of the windscreen do not appear exactly parallel to one another from the eye position 11 of the driver of the car, although these strips are parallel when the windscreen is viewed from directly ahead as indicated in FIGURE 1. However, the angle of inclination of the strips 7 is so designed that throughout the whole of the angle 12 the driver, from his eye position 11, will see the strips 7 of fine fracture particles as substantially vertical with portions of windscreen giving a clear vision to the front near-side of the car.

In FIGURES 4 and 5 there are shown respectively plan and elevational views of apparatus for producing a windscreen in accordance with the present invention and so toughened that it will yield on fracture a pattern similar to that shown in FIGURE 1. The method for producing the sheet of toughened glass which comprises the windscreen will be described with reference to FIGURES 4 and 5 of the accompanying drawings.

In FIGURES 4 and 5 there are shown opposed quenching units comprising air boxes 14 and 15 having their faces curved to conform with the curvature of the bent glass sheet 16 supported in position to be toughened between them. Conveniently the bent glass sheet 16 is carried by tongs 17, and preferably the bent glass sheet 16 is a uniformly heated glass sheet.

As indicated in FIGURE 5, the surfaces of the air boxes facing the glass sheet contain a considerable number of perforations or nozzles so that cold air may issue therefrom towards the uniformly heated glass sheet 16. Means, not shown, are provided for giving the air boxes 14 and 15 a movement of small amplitude in the mean plane of their opposed surfaces so as to distribute the cooling effect of the air jets over the surfaces of the glass in known manner.

Interposed between the perforated faces of the air boxes 14 and 15 and the surfaces of the glass sheet 16 and equidistant from the latter are two annular metal frames 18, each carrying two series of parallel strip-like members comprised respectively by the angle bars 19 and 20. Each series of the parallel strip-like members 19 and 20 is inclined downwardly and outwardly with respect to the edge of the glass sheet which will be the upper edge when the glass sheet is mounted as a windscreen in an automobile. Conveniently the annular metal frames 18 are of the same cross-section as the angle bars 19 and 20, and are made by fixing top and bottom horizontal members adjacent vertical or inclined members.

The parallel strip-like members 19 (shown in detail in FIGURE 6) and 20 carried by one annular metal frame 18 are directly opposed to the corresponding parallel strip-like members 19 and 20 carried by the annular metal frame 18 on the opposite side of the glass sheet 16 so that the corresponding parts of corresponding strip-like members 19 or 20 lie on a radius of the part of the curved glass sheet to which they are nearest.

Air at ambient temperature is forced by fans into the air boxes 14 and 15 at a pressure of about 10″ to 12″ water gauge and the flow of the gaseous chilling air from the air boxes 14 and 15 towards the central part of the uniformly heated glass sheet 16 positioned between the air boxes is interrupted by deflection of the chilling air by the angle bars 19 and 20. Also the chilling air directed at the portions of the glass sheet 16 shielded by the annular frame 18 is interrupted and there are consequently formed in the glass sheet an annular demarcation zone having a lesser degree of toughening than the peripheral region of the glass sheet and within the demarcation zone a central area having parallel inclined strip-like regions of glass toughened alternately to a higher and lower degree.

The method just described employing the apparatus shown in FIGURES 4 and 5 provides a toughened glass sheet 1 similar to that shown in FIGURE 1. The strip-like regions 6 and 7 may be of equal or unequal width as desired by suitable variation of the size of the interposing members which are the angle bars 19 and 20 and of the spacing between these bars 19 and 20. Preferably the fine fracturing regions or strips 7 are narrow in relation to the regions or strips 6.

A toughened glass sheet as illustrated in the preferred embodiment of the invention and having an annular region 3 of glass toughened to a lesser extent than the continuous peripheral region does provide a line of demarcation between the central area and the continuous peripheral region 2 of the glass sheet and this provides the advantage of a reduction in the tendency for fan-shaped fracture patterns to occur.

If desired, the spaces between the angle bars 19 and 20 may be partially obstructed by a wire gauze, for example there may be secured to the annular frame 18 and the angle bars 19 and 20 a sheet of metal gauze of 32 s.w.g. wire woven 30 to the inch to lessen the degree of toughening in the parts of the vision zone which are not directly shielded by the angle bars 19 and 20.

When a windscreen with a symmetrical vision zone is raked back at an angle at large as, for example, 45°, it is found that highly toughened strips formed upon fracture at such an angle as to appear substantially vertical when viewed obliquely across the car seriously impede the view of the driver when looking straight ahead. Accordingly in a windscreen which is to be raked back at such an angle and which is to be made symmetrical so that it is adapted for use with equal facility in a car with a right-hand drive or a left-hand drive, a compromise is reached to ensure reasonable visibility both directly ahead and to the side. The present invention comprehends such a compromise in which the strips of highly toughened glass on the passenger's side of the vehicle will appear to the driver to be at a slight angle to the vertical.

I claim:

1. A toughened glass sheet for use as windscreens in an automobile, the toughened glass sheet having a highly toughened peripheral zone and a viewing zone on one side of a central line extending between the upper and lower edges of the windscreen and being separated from said peripheral zone by a continuous demarcation zone toughened to a lesser degree than the peripheral zone, said viewing zone consisting of elongated areas toughened alternately to a higher and a lesser degree of toughening, said elongated areas sloping downwardly at an obtuse angle to the upper edge of the windscreen and downwardly to the lower edge or toward a linear extension of said lower edge.

2. A toughened glass sheet for use as a windscreen according to claim 1 wherein such viewing zones are symmetrically formed on both sides of said central line and wherein said sloping lesser toughened areas merge into the demarcation zone.

3. A toughened glass sheet for use as windscreens in an automobile, the toughened glass sheet having a highly toughened peripheral zone, and a viewing zone on one side of a central line extending between the upper and lower edges of the windscreen and being separated from said peripheral zone by a continuous demarcation zone toughened to a lesser degree than the peripheral zone, said viewing zone consisting of strips of highly toughened glass alternating with strips of lesser toughened glass, each of the strips being sloped downwardly at an angle of about 30° with a line drawn normal to the top edge of the glass sheet and extending into the respective area of the viewing zone.

4. A wrap-round windscreen having a highly toughened peripheral zone and a viewing zone extending into the wrap-round portion of the windscreen on one side of a central line extending between the upper and lower edges of the windscreen and being separated from said peripheral zone by a continuous demarcation zone toughened to a lesser degree than the peripheral zone and consisting of strips of highly toughened glass alternating with strips of less toughened glass, each of said strips being sloped downwardly at an angle of about 30° with a line drawn normal to the top edge of the windscreen and extending into the respective area of the viewing zone of the windscreen.

5. A wrap-round windscreen having a highly toughened peripheral zone and a viewing zone according to claim 4, wherein such viewing zones are symmetrically formed on both sides of said central line and wherein said less toughened strips merge into the demarcation zone.

References Cited

UNITED STATES PATENTS

| | | | |
|---|---|---|---|
| 2,177,324 | 10/1939 | Long | 65—115 |
| 2,244,715 | 6/1941 | Long | 65—115 |
| 2,866,299 | 12/1958 | Long | 65—115 |
| 2,910,807 | 11/1959 | Chan et al. | 65—115 |
| 2,924,485 | 2/1960 | Miles | 296—84 |
| 2,968,126 | 1/1961 | Richardson | 65—348 |
| 3,114,571 | 12/1963 | Carson et al. | 296—84 |
| 3,146,085 | 1/1964 | Jochim | 65—348 |

FOREIGN PATENTS

| | | |
|---|---|---|
| 1,339,535 | 9/1963 | France. |

BENJAMIN HERSH, *Primary Examiner.*

MILTON BUCHLER, *Examiner.*

J. A. PEKAR, *Assistant Examiner.*